Nov. 6, 1962    J. LIPPART ETAL    3,062,949
WELDING APPARATUS
Filed March 19, 1957    4 Sheets-Sheet 1

Nov. 6, 1962 J. LIPPART ETAL 3,062,949
WELDING APPARATUS
Filed March 19, 1957 4 Sheets-Sheet 3

Nov. 6, 1962 J. LIPPART ETAL 3,062,949
WELDING APPARATUS
Filed March 19, 1957 4 Sheets-Sheet 4

3,062,949
WELDING APPARATUS

John Lippart, Prospect Park, and Alfred W. Klein, Pittsburgh, Pa., assignors to Westinghouse Electric Corporation, East Pittsburgh, Pa., a corporation of Pennsylvania
Filed Mar. 19, 1957, Ser. No. 647,057
8 Claims. (Cl. 219—125)

This invention relates to the art of welding and has particular relationship to the welding of tubes to a sheet or plate.

The necessity of joining tubes to a sheet arises particularly in the making of such apparatus as condensers and heat exchangers for power generators and refrigerating apparatus. In certain such apparatus, it is necessary that the joints between the tubes and the sheet shall be gas-tight seals to avoid leakage of the heating or cooling medium. This requirement is of particular importance in heat exchangers for power generators of the atomic or nuclear type, since leakage in such apparatus would cause radio-active material to flow into the turbines destroying the usefulness of the turbines.

Noble Patent 1,508,711 in FIG. 12 discloses an arrangement for welding a flue 118 to a flue sheet 117 and typifies the prior art. Apparatus based on Noble's teaching when applied to the welding of tubes to a tube sheet by rotating a welding electrode about the tube has proved unsatisfactory. Welds produced in this way were found to be leaky. Another practice which has been in vogue in sealing tubes to sheet is to insert the tubes in the sheet and to produce the seals by passing over the array of junctions between the tubes and the sheet by hand with a welding electrode of the rod type. Because of the number of tubes which are to be joined to each sheet, this procedure has proved highly costly. The making of a single heat exchanger in one situation has cost as much as $100,000.

It is accordingly broadly an object of this invention to provide low cost apparatus for joining a tube to a tube sheet or plate.

This invention in its broader aspects arises from the realization that low cost apparatus for joining tubes to a sheet should include facilities for moving—rotating in the case of a cylindrical tube—a welding electrode about the axis of the tube while the electrode is centering in the tube. It is further realized that Noble suggests such movement, but the Noble apparatus is not satisfactory because it lacks the necessary precision. The wall of each tube of such apparatus as a heat exchanger is relatively thin, and because the Noble electrode cannot be maintained precisely positioned relative to the joint to be welded as it is moved around the joint, attempts to weld tubes to sheet with apparatus such as disclosed by Noble results in frequent perforation of the tubes. This is one of the principal causes of the leaking joints.

It is accordingly another object of this invention to provide low-cost apparatus and a low-labor-cost method for joining tubes of relatively small thickness to a tube sheet by welded seals which shall be gas-tight in the use or practice of which an electrode shall be moved around the joints between the tubes and the sheet.

It is an incidental object of this invention to provide a highly compact welding gun for welding tubes to sheet which shall permit access to corners and to welding near walls.

In accordance with this invention, the welding of a tube to a sheet is carried out with a nonconsumable electrode which is positioned on a mandrel positioned axially in the tube. In the practice of this invention, the sheet is provided with a shoulder around each opening in which a tube is to be sealed, for example, by trepanning, after the opening is cut into the sheet. The tube is then inserted in the opening, for example, by rolling in a position such that the shoulder firmly engages the surface of the tube. The electrode is positioned at a predetermined first angle with reference to the axis of the tube, at a predetermined second angle with reference to the successive planes defined by the axis of the tube and the successive points at which a welding arc from the electrode terminate and the plane of the opening in the sheet through which the tube projects and at a predetermined distance from the outer edge of the shoulder of the sheet which engages the tube. The electrode is then moved around the shoulder while remaining precisely positioned with respect to the axis of the tube and shoulder as just described, and a welding arc is fired between the electrode and the shoulder so that as the electrode is moved a welded seal is produced. The spacing between the electrode and the outer rim of the shoulder must be such that during this movement the arc burns continuously and quietly. The electrode is moved continuously about the axis of the tube through an angle somewhat greater than 360° so that there is an overlap at the point where the welding started. The movement around the joint is now continued while the welding current is decreased or tapered off until the arc is interrupted. The tapering off precludes the formation of a crater. It has been found that the practice of this method leads to a joint between the tube and the sheet which is gas-tight and the tube is not perforated during the welding operation.

Where a joint substantially longer (longitudinally along the tube) than that which can be produced by fusing the shoulder to the sheet is necessary, a ring of filler material may be placed about the tube just above the shoulder, and this filler material may be fused into the weld just described after the latter weld is formed by moving the electrode positioned as just described around the filler ring in the same manner as it was moved around the shoulder. Where the tubes and the sheet are of different materials, a filler material capable of fusing to each of the different materials may be initially placed about the joint of the tube, and the sheet and the filler material may be fused to form a seal by moving the electrode in the manner just described.

In addition to the method of welding as just described, apparatus for welding a tube to a sheet is provided in accordance with this invention. This apparatus includes a mandrel adapted to be positioned within the tube and having a shoulder adapted to engage the upper rim of the tube when the mandrel is positioned therein. This apparatus also includes a sleeve mounted rotatably about the portion of the mandrel extending from the tube. The sleeve is provided with a cap having a receptacle for engaging a flexible shaft connected to a motor so that the sleeve may be rotated by the motor. The sleeve includes a bracket for suspending a welding electrode, and the bracket has facility for setting and maintaining precisely the angular position of the electrode and its distance from the tube.

The novel features considered characteristic of this invention are described generally above. The invention itself both as to its organization and its method of operation, together with additional objects and advantages thereof will be understood from the following description of preferred embodiments taken in connection with the accompanying drawings, in which.

Figure 1:
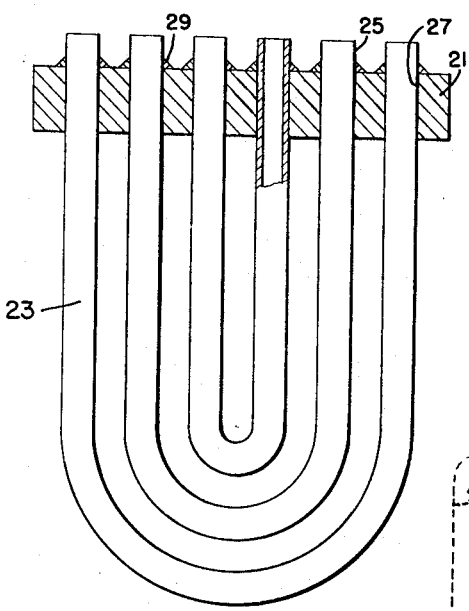
FIGURE 1 is a fragmental view partly in side elevation and partly in section of a heat exchanger produced in the practice of this invention.
Figure 2:
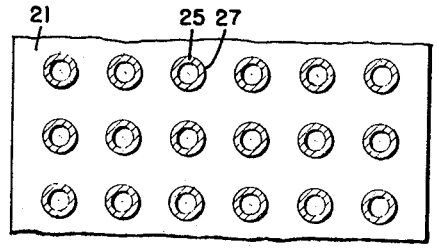
FIG. 2 is a fragmental view in top elevation of the heat exchanger shown in FIG. 1.

FIGS. 1 and 2 show in rudimentary form a heat exchanger to the making of which this invention is applicable. The heat exchanger includes a block or sheet 21 of a material, such as stainless steel, for example No. 347 stainless steel. The exchanger also includes a plurality of U-shaped tubes 23, the ends 25 of which pass through openings 27 in the block. These tubes are also composed of stainless steel, such as No. 347, and are relatively thin. The ends 25 of the tubes 23 are sealed in the openings 27 by arc welded joints 29 and it is essential that the joints be gas tight.

Figure 3:
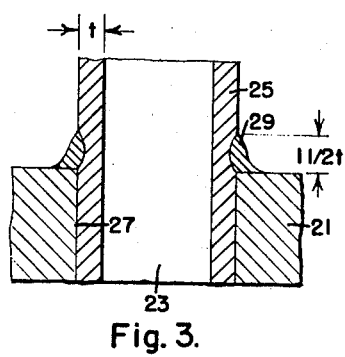
FIG. 3 is a fragmental view in section showing the relationship between the thickness of a tube and the weld produced in sealing the tube in a heat exchanger of the type shown in FIG. 1.

FIG. 3 shows the principal specifications for each weld. It is necessary that the weld shall not penetrate through the wall and shall have a length of the order of one and one-half times the thickness of the sheet.

Figure 4:
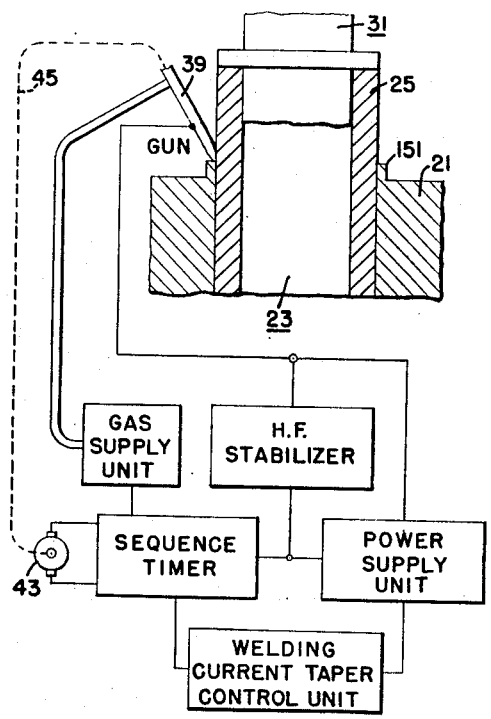
FIG. 4 is a diagrammatic view showing welding apparatus in accordance with this invention.

The apparatus with which the welding is carried out is shown schematically in FIG. 4. This apparatus includes a gun, a gas supply unit, a power supply unit, a high frequency stabilizer, labelled HF stabilizer, a welding current taper control unit and a sequence timer.

The gun is of the non-consumable electrode gas-shielded type and is capable of being rotated about the joint between the tube 23 and the plate or sheet 21 during the welding operation.

Figure 5:
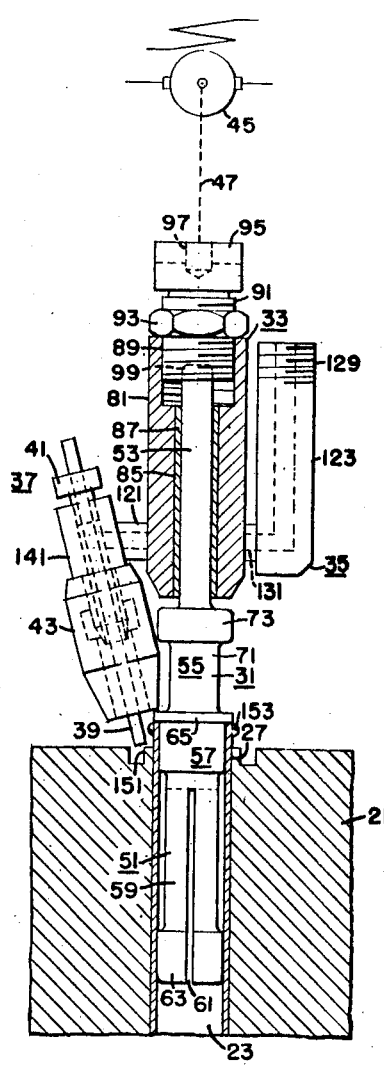
FIG. 5 is a view partly in section and partly in side elevation of a welding gun or torch in accordance with this invention.
Figure 7:
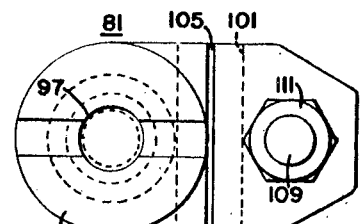
FIG. 7 is a view in top elevation of this body.
Figure 6:
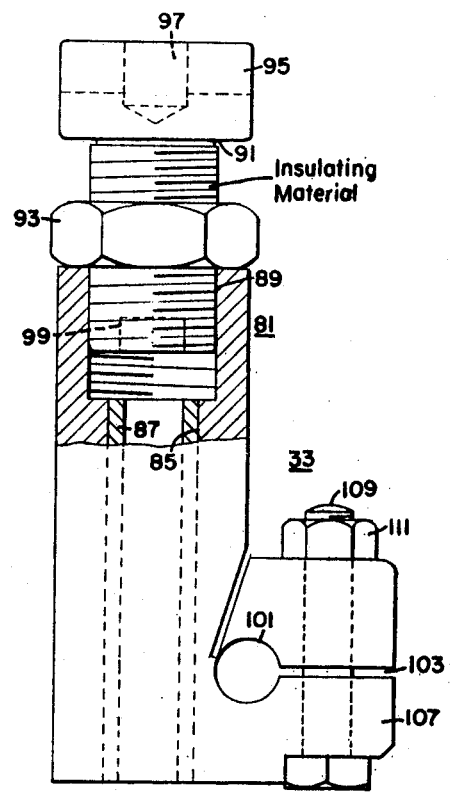
FIG. 6 is a view in side elevation of an electrode supporting body unit included in the apparatus shown in FIG. 5.
Figure 9:
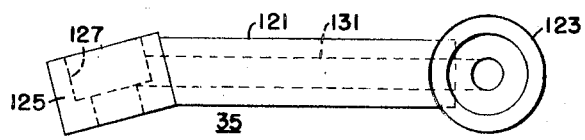
FIG. 9 is a view in top elevation of the adapter shown in FIG. 8.
Figure 8:
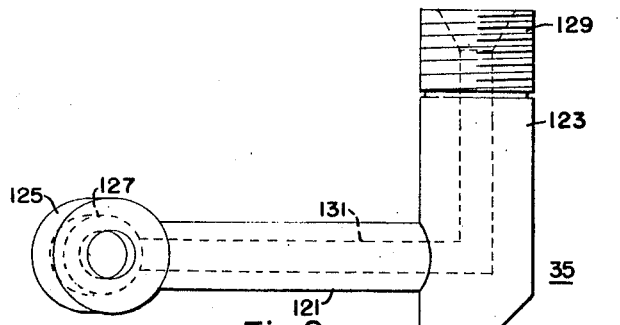
FIG. 8 is a view in side elevation of an adapter cooperative with the body shown in FIG. 6 to support the welding electrode included in the apparatus shown in FIG. 5.
Figure 10:
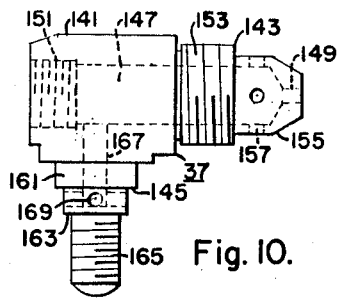
FIG. 10 is a view in side elevation of a holder included in the apparatus shown in FIG. 5.
Figure 11:
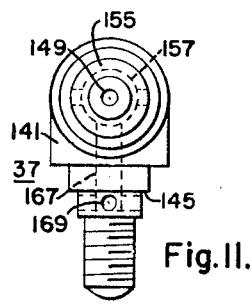
FIG. 11 is a view shown in top elevation of this electrode holder.
Figure 13:
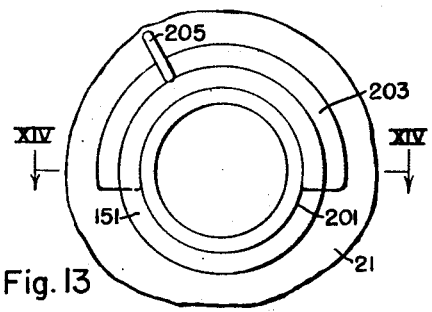
FIG. 13 is a view in top elevation showing the tube and a gage for positioning the electrode in welding a tube to a sheet in accordance with this invention.
Figure 14:
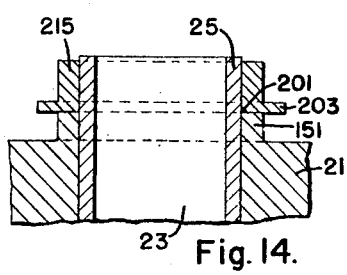
FIG. 14 is a view in section taken along line XIV—XIV of FIG. 13.

The gun (FIGS. 5–11) includes a mandrel 31, an electrode supporting body unit 33 (FIGS. 5, 6 and 7) mounted rotatably on the mandrel 31, an adapter 35 (FIGS. 5, 8 and 9) mounted on the body unit 33, a holder 37 (FIGS. 5, 10 and 11) mounted in the adapter 35, a non-consumable welding electrode 39 held by a head screw 41 which engages the holder 37, and a ceramic cup 43 held by the holder 37 through which the electrode 39 extends and through which shielding gas passes. The body unit 33 is driven by a motor 45 through a flexible shaft 47 thus causing the electrode 41 to rotate about the mandrel 31.

The mandrel 31 is of elongated generally cylindrical form and has a tip 51, an attenuated supporting end 53 and a central section 55. The tip 51 includes a shoulder 57 from which extend fingers 59 formed by cross slots 61 longitudinally of the tip 51 to the shoulder 57. The fingers 59 have knobs 63. The shoulder 57 is terminated by a flange 65. The central section 55 includes an attenuated stub 71 terminated by another shoulder 73. The shoulder 73 is adapted to be engaged by a fork for removal of the mandrel 31 from the tube 23 after a welding operation. The mandrel 31 is preferably composed of copper.

The fingers 59 of the mandrel 31 are resilient so that the mandrel may be readily slipped into a tube 23. Once in the tube, the fingers 59 engage the tube wall so that the mandrel 31 is held firmly. When the mandrel is slipped into a tube 23, the flange 65 engages the rim of the tube.

The body unit 33 includes a sleeve 81 and a clamp 83 and may be composed of an insulating material such as a phenolic condensation product. There is an elongated opening 85 through the sleeve which is provided with a bushing 87 of a metallic material such as hot-rolled steel. The opening 85 terminates in an internally threaded end 89 of greater diameter. A bolt 91 of insulating material such as a phenolic condensation product is screwed into the end 89 and is secured to the sleeve 81 by a nut 93. The head 95 of the bolt 91 is slotted at the top and has a receptacle 97 for engaging the end of the flexible shaft 47. The bolt 91 is provided with a cylindrical seat 99 in its end; this seat 99 engages the end 53 of the mandrel. The vertical position of the electrode 39 may be set within limits by screwing the bolt 91 in or out.

The clamp 83 extends integrally from the sleeve 81 and includes a block of generally trapezoidal form. A circular opening 101 extends partly through the block and partly through the body of the sleeve 81. A slot 103 extends transversely through the block to the opening 101 and another slot 105 extends from the opening 101 thorugh a portion of the body of the sleeve 81 and the junction of the block and the sleeve. There is a hole 107 transversely through the block adaped to pass a bolt 109 which may be secured by a nut 111 engaging the bolt on the side opposite the head.

The adapter 35 (FIGS. 8 and 9) may be composed of brass and is in the form of a right-angle bracket made up of two arms 121 and 123 welded together. The arm 121 is terminated by a cylindrical tip 125, the axis of which is at an angle to the axis of the arm. This tip has an opening 127 therethrough, a portion of the opening being of greater diameter than the remainder. The other arm 123 is provided with an external thread 129 adapted to engage a nipple (not shown) of a conductor from a shielding gas supply through which shielding gas may be transmitted through the bracket. There is an opening 131 extending continuously through the arms 121 and 123 of the adapter 35 and communicating with the opening 127 in the tip 125. This opening is beveled at the end of the arm 123 from which it extends to accommodate the nipple.

The holder 37 (FIGS. 10 and 11) is also in the form of a right angle bracket having a central block section 141 from which projections 143 and 145 extend. An opening 147 extends through the block 141 and the projection 143 and terminates in an attenuated end 149 having a diameter such that the electrode 39 fits in it neatly. The opening 147 has an internal thread 151 at the end remote from the tip 149. The projection 143 has a threaded shoulder 153 from which a beveled tip 155 extends. The tip 155 is provided with four peripheral holes 157 in the portion adjacent the shoulder 153. The internal thread 151 is such as to engage the head screw 41 in which the electrode 39 is secured and the thread 153 is such as to engage a cooperative thread of a ceramic cup 43 through which shielding gas passing through the openings 157 may flow. When the head screw 41 carrying the electrode 39 is screwed into the opening 151 in the block 141, the electrode 39 extends through the block and through the cup 43. The other projection 145 includes a pair of shoulders 161 and 163 of progressively decreasing diameter from which a threaded tip 165 extends. There is an opening 167 in the shoulder 161 which communicates with the opening 147 in the block 141 and with lateral openings 169 in the shoulder 163. The opening 167 may be bored as a continuation of an opening through the block 141 and the part of the opening in the block 141 above opening 147 may be plugged. The projection 145 is set in the opening 127 with the shoulder 161 engaging the wall of the opening 127 and the opening 131 in communication with the opening 169. The threaded tip 165 is adapted to pass through the narrow part of the opening 127 in the adapter and a nut may be screwed on the tip 165 to secure the holder. Gas which enters the opening 131 flows through the openings 169, 167, 147 and 157 into the cup 43.

In the assembled gun, the arm 121 of the adapter 37 from which the cylindrical tip 125 extends is held by the clamp 83 of the body unit 33. For this purpose, the arm 121 is passed through the opening 101 in the clamp and is pinched by the opening when the nut 111 is screwed onto the bolt. The arms 121 and 123 of the adapter 35 are formed in two pieces to facilitate the assembly of the gun. Arm 121 is first slipped into the clamp 83 and then arm 123 is joined to it by welding. The angular position of the adapter 35 about the axis of the clamp opening 101 may be set by releasing the bolt 109 and rotating the arm 121 to the desired position.

The power supply unit may be of any suitable type available in the art but should preferably have facilities for readily varying the welding current during the welding operation so that the current may be tapered off at the end of a weld. Such facilities may preferably include a saturable reactor (not shown) in the power supply unit, the saturation of which may be readily varied during welding by changing the resistance of a variable resistor.

The HF stabilizer may be of any suitable type available in the art but must operate in such a manner as to avoid radio interference, as required by the Civil Aeronautics Authority. The HF stabilizer is connected in circuit with the electrode 39 and work 21 and when energized produces a high frequency spark (or field) between the electrode 39 and work 21—23 to fire an arc.

The sequence timer may be of any suitable type but preferably should be of the type disclosed in an application, Serial No. 647,007, filed concurrently herewith to Austin Dixon, and assigned to Westinghouse Electric Corporation. This sequence timer should include facilities for timing the following sequences: (1) The flow of inert gas is started to prepurge the arc. (2) A predetermined time interval following the start of the prepurge, the power supply unit and the HF stabilizer are energized to fire the arc. (3) After the arc is fired motor 45 for driving the gun is energized. (The motor 45 may also be energized simultaneously with the power supply unit and the HF stabilizer.) (4) A predetermined time interval after the operation in item 2, the high frequency unit may be turned off (this is optional). (5) After a time interval sufficient to permit the gun to rotate through an angle greater by a small magnitude than 360°, the welding taper current control unit is actuated and the current supplied by the power supply unit is gradually tapered off. The tapering may be at a predetermined rate and for a predetermined time suitable for the material being welded. (6) At the end of the taper interval the arc is extinguished. (7) The gas continues to flow for a predetermined time interval after the arc is extinguished to postpurge the weld and then the flow of gas is stopped.

The welding current taper control unit may be of any suitable type and specifically of the type disclosed in the above-mentioned Dixon application. When actuated, it causes the saturation of the reactor in the power supply unit to vary or to produce the taper desired.

The projection from which the threaded tip 165 extends may be rotated in the opening 127 in the adapter bracket to a desired position and locked in this position by the nut. The angular position of the electrode with reference to the axis of the material may thus be set.

The invention will be described as used in a typical practical situation in which tubes 23 having a diameter of 5/8 inch and a thickness of .050 inch are to be welded into a sheet or lock 21 having a thickness of the order of six inches. Tubes have been welded in plates having thicknesses of as high as 18 inches in the practice of this invention. In this case uniform circular ring welds 29 having a height of .075 and a thickness so as not to perforate the tube 23 are to be made. Preparatory to the welding operation, the openings 27 in which the tubes 23 are to be welded are bored in the sheet or plate 21 to the desired dimensions. In addition, a trepanning operation is carried out so that there is a shoulder 151 around each opening (see FIG. 1).

Each tube 23 after being thoroughly degreased by washing with a suitable chemical such as trichloroethylene, is rolled into the associated opening 27 in the sheet 21 or plate. In carrying out the rolling operation every precaution should be taken to prevent grease from penetrating into the junction between the tube 23 and the plate 21. Additional degreasing operations may then be carried out on the tubes and the plate after the rolling of all tubes into the plate.

When a tube 23 is rolled into the opening 27 in the sheet 21, the shoulder 151 bounds the tube near its upper end. In a typical situation the shoulder 151 is of the order of 3/16 of an inch below the upper rim of the tube 21. After the degreasing, a ring 153 of filler material is disposed on each tube just above the junction between the tube 23 and the plate 21.

The mandrel 21 is then slipped into a tube 21 to a position at which its flange 65 engages the upper rim of the tube. The mandrel 31 fits snugly in the tube 21. The remaining portion of the torch or gun is then placed on mandrel end 53 with the sleeve encircling the end of the mandrel and the top of the mandrel engaging the seat 99 in the bolt 91. The flexible shaft 47 is engaged in the receptacle 97 of the bolt 91.

Figure 12:
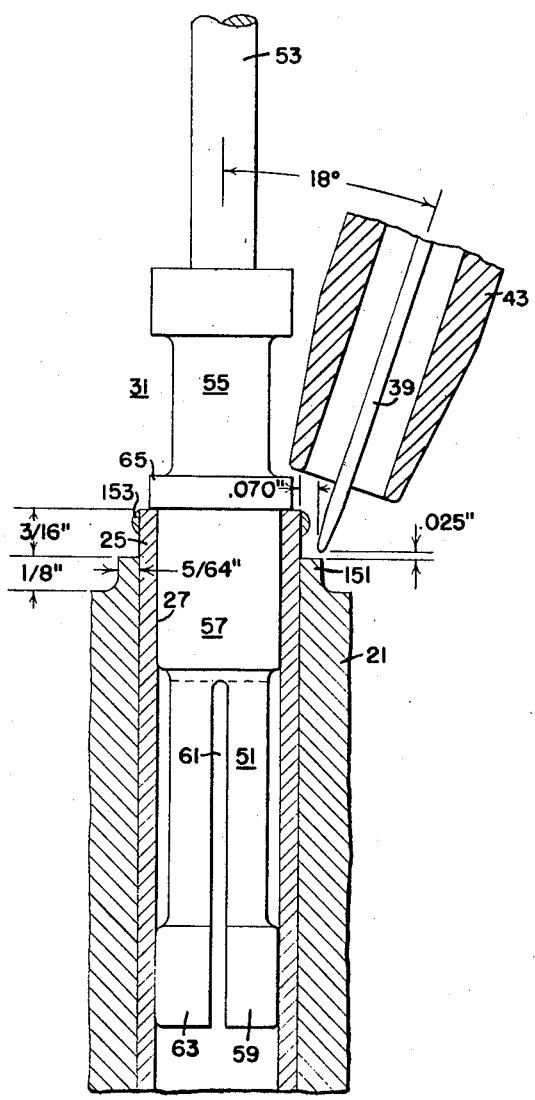
FIG. 12 is a view in side elevation of the apparatus shown in FIG. 5 which shows the relationship maintained between the electrode and the tube and sheet in making a weld between the tube and the sheet in a typical situation.
Figure 15:
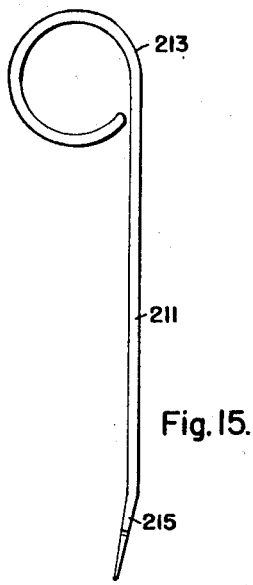
FIG. 15 is a view in side elevation of a wire gage used in positioning the electrode in cooperation with the apparatus shown in FIGS. 13 and 14.
Figure 16:
FIG. 16 is a view in part elevation of the gage shown in FIG. 15.

The gun is now adjusted to the proper position as shown in FIG. 12. For the setting of the gun the apparatus shown in FIGS. 13 through 16 may be used. This apparatus includes a sleeve gage and a wire gage. The sleeve gage includes a semicircular sleeve 201 having a shoulder 203. The gage has a wire handle 205 by means of which it may be positioned. The wire gage includes a flat wire 211 having a loop handle 213 at one end and a notched tip 215 bent at an angle at the other. The sleeve gage is held on the shoulder 151, and the electrode 39 is set so that its tip rests between the shoulder 203 of the sleeve gage and its adjacent neck portion 215. The holder 37 is turned in the opening 127 in the adapter 35 until the electrode is at the desired angle to the axis of the tube. After this operation is carried out for a situation as illustrated in FIG. 12, the electrode 39 is at an angle of about 18° to the axis of the tube 23 and is a distance of the order of .025 from the outer edge of the shoulder 151. The adapter 37 may now be turned in the clamp opening 101 until the electrode 29 is at a trailing angle of about 3 to 5°, as indicated. The position of the electrode 39 may be checked by the wire gage 211.

In the illustrated situation, the electrode 39 is of the thoriated tungsten type and has about 1 to 2% thorium. The body of the electrode has the diameter of 1/16 inch which tapers to about .030 inch at the tip.

After the electrode has been set as just disclosed, the starting switch (not shown) of the sequence timer is actuated, and a welding operation is carried out. In the typical situation illustrated the prepurging gas should be a mixture of argon and helium, the argon being supplied at the rate of 5 to 6 cubic feet per hour and helium at 9 to 10 cubic feet per hour. The prepurging operation should take about three seconds±one second. At the end of the prepurging operation, the power supply unit and the stabilizer are energized immediately causing an arc to be fired between the electrode 39 and the shoulder 151. The flow of welding current then starts the drive motor 45 which rotates the electrode about the mandrel, in the typical situation illustrated at a rate of about 1 to 1⅛ revolutions per minute. The welding current in this situation is of the order of 80 to 85 amperes and the arc voltage of the order of 10 to 12 volts direct current straight polarity.

After the arc is fired, the welding operation then proceeds. During the operation the stabilizer may be turned off, for example 5 seconds±one second after the arc is fired. The electrode rotates through an angle of about 375°±5°, and after it reaches this angle the welding current is gradually tapered to suppress any crater formation. The tapering takes about six seconds±one second. The rotation continues during the tapering interval and stops when the flow of welding current stops. The flow of inert gas then continues for five seconds±two seconds to produce the postpurging operation.

The lower portion of the weld 27 shown in FIG. 3 is thus produced. In many situations the weld is now complete; in others it is necessary that a ring 153 be fused into the joint or seal. In such situations the electrode is reset to a position opposite the outer rim of the ring 153 and then a second welding operation as described above is carried out. The ring is then fused into the weld produced by the first welding operation. A weld as shown in FIG. 3 is then completed.

The above described operation has been used repeatedly to produce sound gas-tight-welds as required. With the apparatus disclosed herein and by the practice of the method in accordance with this invention, such welds may be produced in large numbers at a low cost compared to the cost of producing the same welds by the prior art methods mentioned.

One of the important features of this invention is that the gun is compact. In actual practice is is so compact that it can swing inside of a radius of 1⅜ inch. This gives the gun axis to make seal welds in corners and in situations where the weld is made near a wall.

While preferred embodiments of this invention have been disclosed herein, many modifications thereof are feasible. For example, in situations in which the tube 23 and sheet 21 are of dissimilar materials the shoulder 151 may be replaced by a ring or filler of a material which fuses both with the material of tube 23 and the material of the sheet 21. This invention then is not to be restricted except insofar as is necessitated by the spirit of the prior art.

We claim as our invention:

1. Apparatus for arc welding with a non-consumable electrode a tube to a sheet having an opening, said tube being positioned in said opening and extending through said opening a predetermined distance from the adjacent surface of said sheet, comprising in combination a mandrel having a shoulder to be positioned in said tube with said shoulder engaging the rim of said tube extending from said sheet, a sleeve mounted rotatably on the portion of said mandrel extending from said tube, means connected to said sleeve for suspending said electrode from said sleeve in a position such that a welding arc may be produced and maintained between said sheet and electrode, a flexible shaft connected to the top of said sleeve, and a motor connected to said shaft for rotating said sleeve about said mandrel through said shaft, said sleeve being rotatable relative to said motor.

2. Apparatus for arc welding with a non-consumable electrode a tube to a sheet having an opening therein, said tube being positioned in said opening and extending through said opening a predetermined distance from the adjacent surface of said sheet, comprising in combination a mandrel having a shoulder to be positioned in said tube with said shoulder engaging the rim of said tube extending from said sheet, a sleeve mounted rotatably on the portion of said mandrel extending from said tube, means connected to said sleeve for suspending said electrode from said sleeve in a position such that a welding arc may be produced and maintained between said sheet and electrode, said suspending means permitting said electrode to be positioned at predetermined angles to the axis of said tube and at a predetermined distance from said sheet, a flexible shaft connected to the top of said sleeve for rotating said sleeve, and a motor connected to said shaft about said mandrel through said shaft, said sleeve being rotatable relative to said motor.

3. Apparatus for arc welding with a non-consumable electrode a tube to a sheet having an opening therein, said tube being positioned in said opening and extending through said opening a predetermined distance from the adjacent surface of said sheet, comprising in combination a mandrel having a shoulder to be positioned in said tube with said shoulder engaging the rim of said tube extending from said sheet, a sleeve mounted rotatably on the portion of said mandrel extending from said tube, means connected to said sleeve for suspending said electrode from said sleeve in a position such that a welding arc may be produced and maintained between said sheet and electrode, said suspending means including means for conducting shielding gas to said electrode, a flexible shaft connected to the top of said sleeve, and a motor connected to said shaft for rotating said sleeve about said mandrel through said shaft, said sleeve being rotatable relative to said motor.

4. Apparatus for arc welding with a non-consumable electrode a tube to a sheet having an opening, said tube being positioned in said opening and extending through said opening a predetermined distance from the adjacent surface of said sheet, comprising in combination a mandrel having a shoulder to be positioned in said tube with said shoulder engaging the rim of said tube extending from said sheet, a sleeve mounted rotatably on the portion of said mandrel extending from said tube, means connected to said sleeve for suspending said electrode from said sleeve in a position such that a welding arc may be produced and maintained between said sheet and electrode, said suspending means including means for positioning said electrode at a predetermined angle to the axis of said tube and means for positioning said electrode at a predetermined angle to the plane defined by the axis of said tube and the plane of said opening, a flexible shaft, connected to the top of said sleeve, and a motor connected to said shaft for rotating said sleeve about said mandrel through said shaft, said sleeve being rotatable to said motor.

5. Apparatus for arc welding with a non-consumable electrode a tube to a sheet having an opening, said tube being positioned in said opening and extending through said opening a predetermined distance from the adjacent surface of said sheet, comprising in combination a mandrel having a shoulder to be positioned in said tube with said shoulder engaging the rim of said tube extending from said sheet, mounting means mounted rotatably on the portion of said mandrel extending from said tube, means connected to said mounting means for suspending said electrode from said mounting means in a position such that a welding arc may be produced and maintained between said sheet and electrode, a flexible shaft connected to the top of said mounting means, and a motor connected to said shaft for rotating said sleeve about said mandrel through said shaft, said mounting means being rotatable relative to said motor.

6. A welding torch for welding a tubular member to a plate, comprising a hollow elongated member supported for rotation about its longitudinal axis, said hollow elongated member carrying an electrode laterally of the longitudinal axis of the hollow elongated member, means for continuously supplying electric current to said electrode as the elongated member rotates, a shaft extending axially through said elongated member, said shaft being electrically insulated from said elongated member, said shaft having a support member constructed and arranged for engaging the tubular member to be welded and for supporting the torch with the electrode in spaced relationship to the tubular member and plate to be welded together, and means for rotating said elongated member about said shaft so that said electrode is carried in a circular path about the tubular member to be welded.

7. A welding torch for welding a tubular member to a plate, comprising a hollow elongated member supported for rotation, an electrode carried by said elongated member laterally of the axis of rotation of the hollow elongated member, means for continuously supplying electric current to said electrode as the elongated member rotates, a shaft extending axially through said elongated member, said shaft being electrically insulated from said elongated member, a support member secured to the end of said shaft and extending adjacent said electrode and in coextensive relationship with said shaft, said support member being constructed and arranged to engage said tubular member to be welded, and means for rotating said elongated member about said shaft so that said electrode is carried in a circular path about the tubular member to be welded.

8. A welding torch for welding a tubular member to a plate, comprising a hollow member supported for rotation about its axis, said hollow member carrying an electrode, means for continuously supplying electric current to said electrode as the hollow member rotates, a shaft extending through said hollow member, said shaft being electrically insulated from said hollow member and having a support member constructed and arranged for engaging the tubular member to be welded and for supporting the torch with the electrode in spaced relation to the tubular member and plate to be welded together, and means for rotating said hollow member about said shaft so that said electrode is carried in a circular path about the tubular member to be welded.

References Cited in the file of this patent

UNITED STATES PATENTS

| | | |
|---|---|---|
| 874,084 | Jottrand et al. | Dec. 17, 1907 |
| 1,508,713 | Noble | Sept. 16, 1924 |
| 1,614,501 | Stoekle | Jan. 18, 1927 |
| 1,949,251 | Gilbert | Feb. 27, 1934 |
| 2,228,087 | Rose | Jan. 7, 1941 |
| 2,282,186 | Henninger | May 5, 1942 |
| 2,350,716 | Bissout et al. | June 6, 1944 |
| 2,496,347 | Herbst | Feb. 7, 1950 |
| 2,790,656 | Cook | Apr. 30, 1957 |
| 2,795,689 | McNutt | June 11, 1957 |
| 2,908,805 | Apblett | Oct. 13, 1959 |

FOREIGN PATENTS

| | | |
|---|---|---|
| 743,555 | Great Britain | Jan. 18, 1956 |